3,467,527
METHOD OF PRODUCING A GROUND MEAT PRODUCT
Hugo E. Wistreich, Chicago, Ill., assignor to B. Heller & Co., a corporation of Illinois
No Drawing. Filed Sept. 17, 1965, Ser. No. 488,261
Int. Cl. A23l 1/40; A22c
U.S. Cl. 99—108                              10 Claims

ABSTRACT OF THE DISCLOSURE

A method of preparing a smoke flavoring composition useful for treating comminuted meat products comprising an oil extract of an aqueous smoke flavoring composition substantially free of acidic reacting organic material and having the anions of organic acids present in the form of edible salt.

---

This invention relates to condiments. More particularly, it relates to smoke flavoring compositions. Still more particularly, it relates to smoke flavoring compositions useful in comminuted meat products (of the cooked variety) and the method of preparation of such compositions.

In accordance with the invention, an oil smoke flavoring compostion or an emulsion thereof is prepared by extracting an aqueous smoke flavor solution with oil and substantially eliminating the free acidity of the extract. Such a smoke flavoring is useful in its own right and in conjunction with spice extractives. By incorporating the neutralized compositions, it is possible to impart to meat products desirable flavors without reduction in the ability of the cooked product to absorb moisture or to resist drip loss.

The manufacture of comminuted meat products such as sausage, frankfurters, bologna, meat loaf and the like is a complex operation. These ground meat products are prepared from ground meat, curing agents, water binding agents and flavoring materials. Many substances have been used heretofore to assist in the absorption of water and to render the fat emulsions stable so as to maintain a juicy, smooth textured product.

In most instances, particularly in the cooked ground meat products wherein the sausage, meat loaf, etc., will be heated to at least 155° F., the heat tends to have a destructive effect on the conditioners and to minimize their effectiveness. The degree of shrinkage resulting from breakdown of emulsions and drying out, often has been attributed to the effectiveness or noneffectiveness of the water binding agents. In general this was true when the flavoring compositions were spice extractives such as oils of capsicum, nutmeg, etc.

The present invention is based upon the discovery that smoke flavoring compositions prepared as the aqueous condensates of wood smoke or aqueous extracts of wood smoke or as the oil extracts of the aqueous media, the latter being products which inherently contain up to about 1.5% of acetic acid and the former having even larger quantities of free acids, are different from the conventional flavoring compositions because they contribute strongly to "shorting out" the meat, i.e., to the instability of the emulsion whereby moisture and fat are lost during the treatments which involve heat.

In producing, for example, emulsion-type sausages, by a conventional chopping procedure, ground meat, and meat trimmings which may be either raw or cured, together with curing salt, binder and seasonings (usually consisting of or comprising spices, spice essence, spice oils and/or oleoresins) are blended in a suitable chopper.

As the ice melts, the resultant ice water is largely absorbed by the comminuted meat and carries the added salt and seasoning into the meat mixture. Subsequently, the temperature of the meat product is elevated by heating. During the heating there occurs the natural phenomenon of liquefaction as a result of which cooked meats tend to lose water and fat and to dry out quickly in spite of the presence of so-called conditioning agents. When losing moisture and fat, the natural result is the loss of some of the flavoring materials. Minimizing the loss of moisture and of flavoring which is an important cost item, is one of the advantages of the use of the smoke flavoring composition of this invention.

The smoke flavoring composition compatible with other spice extractive and of reduced tendenecy to "short out" the meat, is prepared from a product of the destructive distillation of wood or an aqueous extract of the constituents of smoke from wood burned with a limited amount of air.

The primary difference between the products of the two systems is the relative quantities of aliphatic acids and phenolic hydrocarbon compounds. These smoke flavorings may contain up to 12% of acidic constituents and the oil smoke flavorings obtained by extraction of aqueous smoke compositions contain from about 0.5% to 1.5% of acetic acid solutions exhibiting a pH of about 5 or less.

Oils utilized in the preparation of oil smoke flavorings are edible vegetable oils such as corn oil, soya-bean oil, peanut oil, cottonseed oil and the like and mixtures thereof.

The deleterious "shorting out" characteristics of the acidic smoke flavorings are substantially reduced by treatment of the flavoring with alkaline agents. The acidic solutions of aqueous smoke solution or the acidic oil extract of aqueous smoke solution are neutralized to render the extract substantially free of acidic reacting organic material, i.e., to an extent (measured in water extract) producing a pH in the range between about 5.5 and about 8.5 so that the anions of organic acids are present in the form of edible salts.

Suitable edible, food grade alkaline agents for the purpose of this invention are, for example, sodium hydroxide, potassium hydroxide, sodium phosphate, disodium hydrogen phosphate, sodium tripolyphosphates, sodium citrate, sodium bicarbonate, etc.

The neutralized oil smoke flavoring composition which are substantially free of unbound organic acids, contain some water in dispersed form, i.e., dissolved or dispersed as droplets, and salts of the organic acidic constituents. The neutralized oil smoke-flavoring compositions are useful per se or may be prepared in emulsion form of the oil-in-water type which are stabilized by the use of industrial emulsifiers and stabilizers. Typical stabilizers are natural products, for example, vegetable gums such as karaya gum, locust bean gum and the like, pectins, alginates as well as synthetic products such as carboxymethyl cellulose. Typical food grade emulsifying agents are polysorbates and the like.

In preparing the emulsion form of neturalized smoke flavoring composition, water soluble emulsifier is dissolved in water and the stabilizer solution mixed with the oil smoke flavoring composition prior to or at the time of strong agitation as when passing the mixture through a homogenizer. Alternatively, the emulsifier may be added to the water-oil mixture with stirring and the mixture agitated until the emulsifier dissolves in the mixture, following which the mixture is strongly agitated to effect dispersion of the oil phase in the aqueous medium as the continuous phase.

In the preparation of a seasoning material, the smoke flavoring composition, oleoresins, essential oils and essences of desired varieties and in desired proportions may be mixed to form liquid mediums or many be added to a relatively large amount of particulate, i.e., powdered or granular, soluble carrier such as salt or dextrose. The ingredients when they are incorporated into a solid carrier are mixed, for example, in a blender equipped with a helical stirrer until a uniform mixture is obtained. In general, the soluble carrier will constitute 85% to 95% of the mixture. The flavoring extracts may be admixed prior to being admixed with the carrier or may be added individually for admixing with carrier and other components of the seasoning.

To further stabilize the oil flavorings or seasonings oil soluble antioxidants such as butylated hydroxy anisole or butylated hydroxy toluene may be incorporated in the seasoning individually or collectively. The amount of antioxidant added will usually constitute from 0.02% to 0.2% by weight of the mixture.

The quantity of oil flavoring compositions to be used in meat products is subject to considerable variation depending upon the character of the meat product.

The value of the invention may be further understood by reference to the illustrative embodiments thereof described below, it being understood that the detailed description is given by way of explanation and illustration and not by way of limitation, since various changes may be made without departing from the spirit and scope of the invention. In the examples, all components are given in parts by weight. In such ground meat products as meat loaf, frankfurters, sausages and the like, the quantity of oil smoke flavoring and oil smoke emulsions and oil smoke flavoring-containing seasonings generally constitute between about 0.05% and 0.5% by weight of the total composition.

There is also a wide disparity between the amount of oil essences used, for example, between the amount of oil of capsicum and oil of clove in seasoning emulsions. With regard to a seasoning emulsion, the ratio of oil of capsicum to oil of clove will generally be in the range between 1:2 and 1:4. The ratio of the essences to oil smoke flavoring will usually be in the range between about 1:2 and 1:5.

EXAMPLE I

An oil smoke flavor composition prepared by extraction of an aqueous smoke condensate, with corn oil was split into a portion A to be used as a control and a portion B.

Water extract of this oil, when titrated, indicate the presence of 0.5% of acetic acid.

Portion B of the extract was treated with an aqueous solution of sodium hydroxide until titrated water extract of the oil phase indicate a pH of approximately 7, at which point the acetic acid constituent is present as the acetate salt.

Treated portion B was allowed to stand for two hours and the oil phase was decanted from the aqueous phase.

The oil smoke flavoring phase was mixed with polysorbate emulsifier to produce a composition comprising 80% smoke flavoring oil, 2% of polysorbate agent with the balance being dissolved and/or dispersed aqueous solution of sodium acetate.

A typical luncheon meat was prepared using 60 pounds of veal, 40 pounds of pork, 25 pounds of ice, and 2 pounds of salt. This meat composition was divided into three portions. Portion M1 was canned in 12 ounce cans without flavoring. Portion M2 had incorporated therein, 0.5% of the natural oil smoke flavoring composition of portion A and was then canned. Porton M3 had incorporated therein 0.5% of the oil smoked flavoring composition recovered after processing to eliminate free acids and was then canned. The meat compositions were then heat treated in a retort at temperatures in the range between about 230° F. and 250° F. for a period of 2 hours. The meat attained an internal temperature of approximately 230° F. and was then cooled.

The heat treated cans of meat composition M1 produced an average drip loss of 0.5 ounce per 12 ounce can. The heat treated cans of meat composition M2 (oil smoked flavoring with free acids) produced an average drip loss of 1.5 ounces per 12 ounce can.

The heat treated can of meat composition M3 (neutralized oil smoked flavoring) produced an average drip lass of 0.5 ounce per 12 ounce can.

EXAMPLE II

An oil smoke flavor composition was divided into a portion C and a portion D.

Portion D was neutralized with a 2% solution of sodium tripolyphosphate. To this neutralized oil flavoring composition was added 2% by weight of the total mix of karaya gum. After stirring until the gum dissolved in the aqueous solution, 2% of spice oils was added and the mixture was homogenized by passage through a milk homogenizer.

Portion C of the oil smoked flavoring was mixed with an aqueous karaya gum solution and with 2% of spice oils solution so as to give the composition a substantially identical oil-water proportion, i.e., giving the same compositions a content approximately of 77% of oil smoked flavoring, approximately 18% of water, 2% of emulsifier and 2% of spice oils.

A typical cooked frankfurter formula is as follows: 23½ pounds of pork, 50 pounds of beef, 20 pounds of ice, 2 pounds salt. The beef is ground through a 1" plate and the pork trimmings are ground through a ³⁄₁₆" plate. The ground beef is seasoned in a cutter with salt, cure and seasoning and chopped, adding 10 pounds of ice until the ice is absorbed. The remainder of the ice is added together with the pork and chopped until the temperature reaches 60° F.

One portion of this chopped meat composition N1 had incorporated therein 0.5% by weight of oil smoked flavoring composition C. The chopped material was then stuffed into suitable casings.

To a second portion of the chopped meat N2 was added 0.5% by weight of oil smoked composition D. The frankfurters were dried and heat treated without smoke for 30 minutes and the heat process completed when the internal temperature of the frankfurters was about 175° F. The frankfurters utilizing oil smoked composition C showed an average loss in weight of approximately 6%. The frankfurters containing oil smoked composition D showed an average weight loss of approximately 2%.

Although the invention has been described in connection with specific embodiments thereof, it will be understood that they are to be regarded as limitations upon the scope of the invention only insofar as they are included in the accompanying claims.

I claim:

1. A smoke flavoring composition useful for treating comminuted meat products comprising an oil extract of an aqueous smoke flavoring composition substantially free of acidic reacting organic material and having a water extract pH in the range between about 5.5 and 8.5.

2. A smoke flavoring composition useful for treating comminuted meat products comprising an oil extract of an aqueous smoke flavoring composition substantially free of acidic reacting organic material having the acetic acid constituent thereof present as the acetate salt, said product having a pH in the range between about 5.5 and 8.5.

3. A flavoring emulsion useful for treating comminuted meat products comprising as dispersed phase an oil extract of aqueous smoke flavoring composition substantially free of unbound organic acids and having a pH in the range between about 5.5 and 8.5, and an aqueous medium as the continuous phase.

4. A flavoring emulsion useful for treating comminuted meat products comprising as dispersed phase an oil extract of aqueous smoke flavoring composition substantially free of unbound acids having the acetic acid constituent thereof present as the acetate salt, said product having a pH in the range between about 5.5 and 8.5, and an aqueous medium as the continuous phase.

5. The method of preparing an oil smoked flavoring composition useful for treating comminuated meat products and substantially free of unbound organic acids comprising treating an oil extract of aqueous smoke flavoring composition with a quantity of edible alkaline agent producing a mixture having a pH in the range between 5.5 and 8.5.

6. The method of preparing an emulsion seasoning composition useful for treating comminuted meat products and containing as a flavoring component an oil smoke flavoring comprising dissolving in a mixture formed by reaction of oil extract of aqueous smoke flavoring composition with aqueous solution of an edible alkaline agent capable of forming salts with organic acids, said mixture having a pH range between about 5.5 and 8.5, water soluble emulsion stabilizer and agitating the mixture whereby the oil is converted into the dispersed phase of an oil-in-water emulsion.

7. The method of preparing an emulsion seasoning composition useful for treating comminuted meat products and containing as a flavoring component an oil smoke flavoring comprising dissolving in a mixture formed by reaction of oil extract of aqueous smoke flavoring composition with aqueous solution of an edible alkaline agent capable of forming salts with organic acids, said mixture having a pH range between about 5.5 and 8.5, a water soluble emulsion stabilizer, adding a spice essence and agitating the mixture whereby the oil is converted into the dispersed phase of an oil-in-water emulsion.

8. The method according to claim 7 wherein the stabilizer is an edible water soluble natural gum.

9. The method of preparing an emulsion seasoning composition useful for treating comminuted meat products and containing as a flavoring component an oil smoke flavoring comprising dissolving in a mixture formed by reaction of oil extract of aqueous smoke flavoring composition with aqueous solution of an edible alkaline agent capable of forming salts with organic acids, said mixture having a pH range between about 5.5 and 8.5, an edible water soluble emulsion stabilizer and an edible water soluble emulsifier, adding a spice essence and agitating the mixture whereby the oil is converted into the dispersed phase of an oil-in-water emulsion.

10. The method of preparing a ground meat product comprising mixing with comminuted meat and oil extract of an aqueous smoke flavoring composition having a pH in the range between about 5.5 and 8.5 and heat processing said mixture, whereby said mixture is substantially reduced in shorting out character due to being substantially free of acidic reacting organic material and having the anions of organic acids present in the form of an edible salt.

References Cited

UNITED STATES PATENTS

| | | | |
|---|---|---|---|
| 2,722,482 | 11/1955 | Betts | 99—140 |
| 2,893,879 | 7/1959 | Huckabee | 99—229 |
| 3,152,914 | 10/1964 | Taylor | 99—140 |

FOREIGN PATENTS 309,405   5/1930   Great Britain.

HYMAN LORD, Primary Examiner

U.S. Cl. X.R.
99—109, 140, 229